(12) United States Patent
Kim et al.

(10) Patent No.: US 12,530,578 B2
(45) Date of Patent: Jan. 20, 2026

(54) LEARNING OPERATING METHOD BASED ON FEDERATED DISTILLATION, LEARNING OPERATING SERVER, AND LEARNING OPERATING TERMINAL

(71) Applicant: UNIVERSITY-INDUSTRY FOUNDATION (UIF), YONSEI UNIVERSITY, Seoul (KR)

(72) Inventors: Seong Lyun Kim, Seoul (KR); Seung Eun Oh, Jeju-si (KR); Eun Jeong Jeong, Seoul (KR); Hye Sung Kim, Seoul (KR)

(73) Assignee: UNIVERSITY-INDUSTRY FOUNDATION (UIF), YONSEI UNIVERSITY, Seoul (KR)

(*) Notice: Subject to any disclaimer, the term of this patent is extended or adjusted under 35 U.S.C. 154(b) by 911 days.

(21) Appl. No.: 17/731,061

(22) Filed: Apr. 27, 2022

(65) Prior Publication Data
US 2022/0253752 A1 Aug. 11, 2022

Related U.S. Application Data

(63) Continuation of application No. PCT/KR2020/001021, filed on Jan. 21, 2020.

(51) Int. Cl.
*G06N 3/08* (2023.01)
*G06N 3/098* (2023.01)
*G06N 5/043* (2023.01)
*G06N 20/20* (2019.01)

(52) U.S. Cl.
CPC ............ *G06N 3/08* (2013.01); *G06N 3/098* (2023.01); *G06N 5/043* (2013.01); *G06N 20/20* (2019.01)

(58) Field of Classification Search
CPC .................................................. G06N 3/098
See application file for complete search history.

(56) References Cited

U.S. PATENT DOCUMENTS 10,402,469 B2 * 9/2019 McMahan ............... G06F 17/17
2019/0340534 A1 11/2019 McMahan

FOREIGN PATENT DOCUMENTS

KR 10-2020-0083234 A 7/2020

OTHER PUBLICATIONS

Jeong et al (Communication-Efficient On-Device Machine Learning: Federated Distillation and Augmentation under Non-IID Private Data 2018) (Year: 2018).*
Park et al ("Distilling On-Device Intelligence at the Network Edge" Aug. 2019) (Year: 2019).*

(Continued)

*Primary Examiner* — Lut Wong

(57) ABSTRACT

According to the present disclosure, disclosed are a learning operating method based on a federated distillation, a learning operating server, and a learning operating terminal which calculate a local average logit by collecting data samples by the terminal, transmit the local average logit and seed samples to an uplink of a server, perform distillation of a global model based on the seed sample and the local average logit by the server to solve the problems of the privacy and communication overhead generated in the distributed network.

12 Claims, 13 Drawing Sheets

---

Algorithm 1 Federated distillation (FD)

Require: Prediction function: $F(w, input)$, Loss function: $\phi(F, label)$, Ground-truth label: $y_{input}$ 1: while not converged do
2:    procedure LOCAL TRAINING PHASE (at each device)
3:       for $n$ steps do : $B, y_B \leftarrow \mathbb{S}$
4:          for sample $b \in B$ do
5:             $w^{(i)} \leftarrow w^{(i)} - \eta \nabla \{\phi(F(w^{(i)}, b), y_b) + \gamma \cdot \phi(F(w^{(i)}, b), \hat{F}^{(i)}_{k, y_b})\}$
6:             $F^{(i)}_{k, y_b} \leftarrow F^{(i)}_{k, y_b} + F(w^{(i)}, b), cnt^{(i)}_{k, y_b} \leftarrow cnt^{(i)}_{k, y_b} + 1$
7:       for label $\ell = 1, 2, \cdots, L$ do
8:          $\bar{F}^{(i)}_{k, \ell} \leftarrow F^{(i)}_{k, \ell} / cnt^{(i)}_{k, \ell}$ : return $\bar{F}^{(i)}_{k, \ell}$ to server
9:    procedure GLOBAL ENSEMBLING PHASE (at the server)
10:       for each device $i = 1, 2, \cdots, M$ do
11:          for label $\ell = 1, 2, \cdots, L$ do
12:             $\bar{F}_{k, \ell} \leftarrow \bar{F}_{k, \ell} + \bar{F}^{(i)}_{k, \ell}$
13:       for each device $i = 1, 2, \cdots, M$ do
14:          for label $\ell = 1, 2, \cdots, L$ do
15:             $\hat{F}^{(i)}_{k+1, \ell} \leftarrow \bar{F}_{k, \ell} - \bar{F}^{(i)}_{k, \ell}, \hat{F}^{(i)}_{k+1, \ell} \leftarrow \hat{F}^{(i)}_{k+1, \ell}/(M-1)$ : return $\hat{F}^{(i)}_{k+1, \ell}$ to device $i$
   end while

(56) References Cited

OTHER PUBLICATIONS

Jihong Park et al., "Distilling On-Device Intelligence at the Network Edge", arXiv:1908.05895v1, Aug. 16, 2019 [Accessed: Sep. 29, 2020], Source: https://arxiv.org/abs/1908.05895, pp. 1-7; drawing 4(a).

Eunjeong Jeong et al., "Communication-Efficient On-Device Machine Learning: Federated Distillation and Augmentation under Non-IID Private Data", arXiv:1811.11479v1, Nov. 28, 2018 [Accessed: Sep. 29, 2020], Source: https://arxiv.org/abs/1811.11479, pp. 2-5.

Jihong Park et al., "Wireless Network Intelligence at the Edge", Proceedings of the IEEE, vol. 107, No. 11, pp. 2204-2239, Oct. 11, 2019, pp. 2224-2233.

Eunjeong Jeong et al., "Multi-hop Federated Private Data Augmentation with Sample Compression", arXiv:1907.06426v1, Jul. 15, 2019 [Accessed: Sep. 29, 2020], Source: https://arxiv.org/abs/1907.06426, section 1-4.

\* cited by examiner

| | 100 | | 120 | |
|---|---|---|---|---|
| | LABEL | 1 | 2 | 3 |
| logit N LOGITS (110) | $logit(x_1)$ | 0.7 | 0.2 | 0.1 |
| | $logit(x_2)$ | 0.4 | 0.3 | 0.3 |
| | ⋮ | ⋮ | ⋮ | ⋮ |
| | $logit(x_N)$ | 0.3 | 0 | 0.7 |

FIG. 3

Algorithm 1 Federated distillation (FD)

Require: Prediction function: $F(w, input)$, Loss function: $\phi(F, label)$, Ground-truth label: $y_{input}$ 1: while not converged do
2:    procedure LOCAL TRAINING PHASE (at each device)
3:       for $n$ steps do : $B, y_B \leftarrow \mathbb{S}$
4:          for sample $b \in B$ do
5:             $w^{(i)} \leftarrow w^{(i)} - \eta \nabla \{\phi(F(w^{(i)}, b), y_b) + \gamma \cdot \phi(F(w^{(i)}, b), \hat{F}^{(i)}_{k,y_b})\}$
6:             $F^{(i)}_{k,y_b} \leftarrow F^{(i)}_{k,y_b} + F(w^{(i)}, b), cnt^{(i)}_{k,y_b} \leftarrow cnt^{(i)}_{k,y_b} + 1$
7:       for label $\ell = 1, 2, \cdots, L$ do
8:          $F^{(i)}_{k,\ell} \leftarrow F^{(i)}_{k,\ell} / cnt^{(i)}_{k,\ell}$ : return $F^{(i)}_{k,\ell}$ to server
9:    procedure GLOBAL ENSEMBLING PHASE (at the server)
10:      for each device $i = 1, 2, \cdots, M$ do
11:         for label $\ell = 1, 2, \cdots, L$ do
12:            $\bar{F}_{k,\ell} \leftarrow \bar{F}_{k,\ell} + F^{(i)}_{k,\ell}$
13:      for each device $i = 1, 2, \cdots, M$ do
14:         for label $\ell = 1, 2, \cdots, L$ do
15:            $\hat{F}^{(i)}_{k+1,\ell} \leftarrow \bar{F}_{k,\ell} - F^{(i)}_{k,\ell}, \hat{F}^{(i)}_{k+1,\ell} \leftarrow \hat{F}^{(i)}_{k+1,\ell}/(M-1)$ : return $\hat{F}^{(i)}_{k+1,\ell}$ to device $i$ end while

FIG. 4

Algorithm 1 FLD with Mix2up (Mix2FLD)

1: Require: $\{S_d\}$ with $d \in \mathcal{D}$, $\lambda \in (0,1)$
2: while $|G_{out,n}^p - G_{out,n}^{p-1}|/|G_{out,n}^{p-1}| \geq \varepsilon$ do
3: Device $d \in \mathcal{D}$: ▷ *Output upload*
4:    if $p=1$ generates $\{\tilde{s}_d^{[i,j]}\}$ via (6) end if ▷ *Mixup*
5:    updates $w_d^{(k)}$ in (1) and $\bar{F}_{d,n}^p$ in (2) for $K$ iterations
6:    unicasts $\{\bar{F}_{d,n}^p\}$ (with $\{\tilde{s}_d^{[i,j]}\}$ if $p=1$) to the server
7: Server: ▷ *Output-to-model conversion*
8:    if $p=1$ generates $\{\bar{s}_{d,d',n}^{[i,j][i',j']}\}$ via (7) end if ▷ *Inverse-Mixup*
9:    computes $G_{out,n}^p$
10:    updates $w_s^{(k)}$ via (5) for $K_s$ iterations
11:    broadcasts $G_{mod}^p = w_s^{(K_s)}$ to all devices
12: $p \leftarrow p + 1$
13: Device $d \in \mathcal{D}$ substitutes $w_d^{(0)}$ with $G_{mod}^p$ ▷ *Model download*
14: end while

FIG. 5

(c) Asymmetric channels, IID dataset (d) Asymmetric channels, IID dataset

LEARNING OPERATING METHOD BASED ON FEDERATED DISTILLATION, LEARNING OPERATING SERVER, AND LEARNING OPERATING TERMINAL

CROSS-REFERENCE TO RELATED APPLICATIONS

This application is a by-pass continuation application of International Patent Application No. PCT/KR2020/001021 filed on Jan. 21, 2020, the contents of which are incorporated by reference herein in its entirety.

TECHNICAL FIELD

The present disclosure relates to a learning operating method, and more particularity, to a method for operating a learning based on federated distillation and reducing a communication overhead.

This study relates to high accurate positioning enabled MIMO transmission and network technologies for next generation 5G V2X services (No. 1711083489) of a research project which was conducted with the funding of the Ministry of Science and ICT (Government) in 2019 with the support of the Information and Communication Technology Promotion Center.

BACKGROUND ART

In a distributed network environment in which a number of samples owned by a terminal is limited, when each terminal performs local training, there is a problem in that a model biased for the samples is generated. At this time, the terminals exchange information therebetween to solve the overfitting problem generated in a local learning situation and improve the overall test accuracy.

According to a method of directly exchanging raw data samples between terminals in the distributed network, when sizes and a number of raw data samples are considered, a payload size and a communication overhead are very large. Further, the privacy is not protected.

SUMMARY OF THE INVENTION

The present disclosure relates to a learning operating method and an object thereof is to calculate a local average logit by collecting data samples by the terminal, transmit the local average logit and seed samples to an uplink of a server, perform distillation of a global model based on the seed samples and the local average logit by the server to solve the problems of the privacy and communication overhead generated in the distributed network.

Other and further objects of the present invention which are not specifically described can be further considered within the scope easily deduced from the following detailed description and the effect.

In order to solve the above-described problems, according to an aspect of the present disclosure, a learning operating method in a distributed network is a learning operating method in a distributed network configured by a server and a plurality of terminals and includes: a step in which the terminals collect data samples to calculate local average logits and transmit the local average logits to an uplink of the server; a step in which the terminals transmit seed samples to the uplink of the server; and a step in which the server performs the distillation of a global model based on the seed samples and the local average logit.

The learning operating method may further include: before the step in which the server performs the distillation of the global model, a step in which the server assigns a random noise to the seed samples to protect information.

The step in which the server performs the distillation of the global model based on the seed samples and the local average logit includes: a step of converting the local average logit into a global model parameter; and a step of training the global model with the global model parameter and the seed samples.

The learning operating method may further include: transmitting the trained global model to a downlink of the server.

The step in which the terminals collect data samples to calculate a local average logit and transmit the local average logits to an uplink of the server includes: a step in which the terminals classify samples for every local logit obtained by performing the local training, among the data samples to store the samples as a local label; a step in which the terminals calculate a local average logit for every local label; and a step in which the terminals transmit the local average logit for every local label to the server.

The plurality of terminals includes a first terminal to a third terminal, the learning operating method may further include: a step in which the server trains the global model using the local average logit for every local label received from the first terminal and the second terminal; and a step in which the third terminal receives the trained global model from the server to reflect the trained global model to a loss function to perform second local training.

The step in which the server trains the global model using the local average logit for every local label received from the first terminal and the second terminal is repeated until a predetermined training accuracy is equal to or higher than a target.

The learning operating method may further include: a step in which the terminals transmit a update start timing of a local model and a size of the local model to the server; a step in which the terminals convert the local average logits into local heterogeneous logits and then transmit the local heterogeneous logits to the server; a step in which the server receives the update start timing of the local model of each terminal and the size of the local model of each terminal; a step in which the server receives the local heterogeneous logits and generates global heterogeneous logits using the local heterogeneous logits; and a step in which the server broadcasts the global heterogeneous logits to the terminals.

The local heterogeneous logits are converted from the local average logits based on a temperature of the terminals and the temperature is expressed by a descending function with respect to an elapsed time from the update start timing or expressed by a descending function with respect to a learning cycle of the local model.

The global heterogeneous logits are calculated by applying a weight calculated based on the size of the local model of each terminal and the update start timing of each terminal to each local heterogeneous logit.

According to another aspect of the present disclosure, a learning driving server of a distributed network is connected to a plurality of terminals by means of a wireless link, receives a local average logit calculated by collecting the data samples from the terminals by the terminals through the uplink, and receives the seed samples from the terminal through the uplink to convert the local average logit into a global model parameter, train the global model with the global model parameter and the seed sample, and transmit the trained global model to the downlink of the server.

the server receives the update start timing of the local model of each terminal and the size of the local model of each terminal, the server receives the local heterogeneous logits and generates global heterogeneous logits using the local heterogeneous logits, and the server broadcasts the global heterogeneous logits to the terminals.

According to an aspect of the present disclosure, a learning driving terminal of a distributed network is connected by means of the server and a wireless link and collets data samples to calculate a local average logit, transmit the local average logit to the uplink of the server, and transmit seed samples to the uplink of the server.

The server converts the local average logit into the global model parameter and trains the global model with the global model parameter and the seed sample, and receives the trained global model through the downlink to reflect the global model to the loss function to perform the local training.

The terminal transmits a update start timing of a local model and a size of the local model to the server and converts the local average logits into local heterogeneous logits and then transmits the local heterogeneous logits to the server.

As described above, according to the exemplary embodiments of the present disclosure, a terminal collects data samples to calculate a local average logit, transmit the local average logit and seed samples to an uplink of a server and the server performs distillation of a global model based on the seed sample and the local average logit, thereby solving the problems of the privacy and communication overhead generated in the distributed network.

Even if the effects are not explicitly mentioned here, the effects described in the following specification which are expected by the technical features of the present disclosure and their potential effects are handled as described in the specification of the present disclosure.

BRIEF DESCRIPTION OF THE DRAWINGS

FIG. 3 is a view illustrating a format of a logit vector according to an exemplary embodiment of the present disclosure;

FIG. 4 is a view illustrating an FD algorithm according to an exemplary embodiment of the present disclosure;

FIG. 5 is a view illustrating an FLD algorithm according to an exemplary embodiment of the present disclosure;

DETAILED DESCRIPTION OF THE EMBODIMENT

Figure 1:
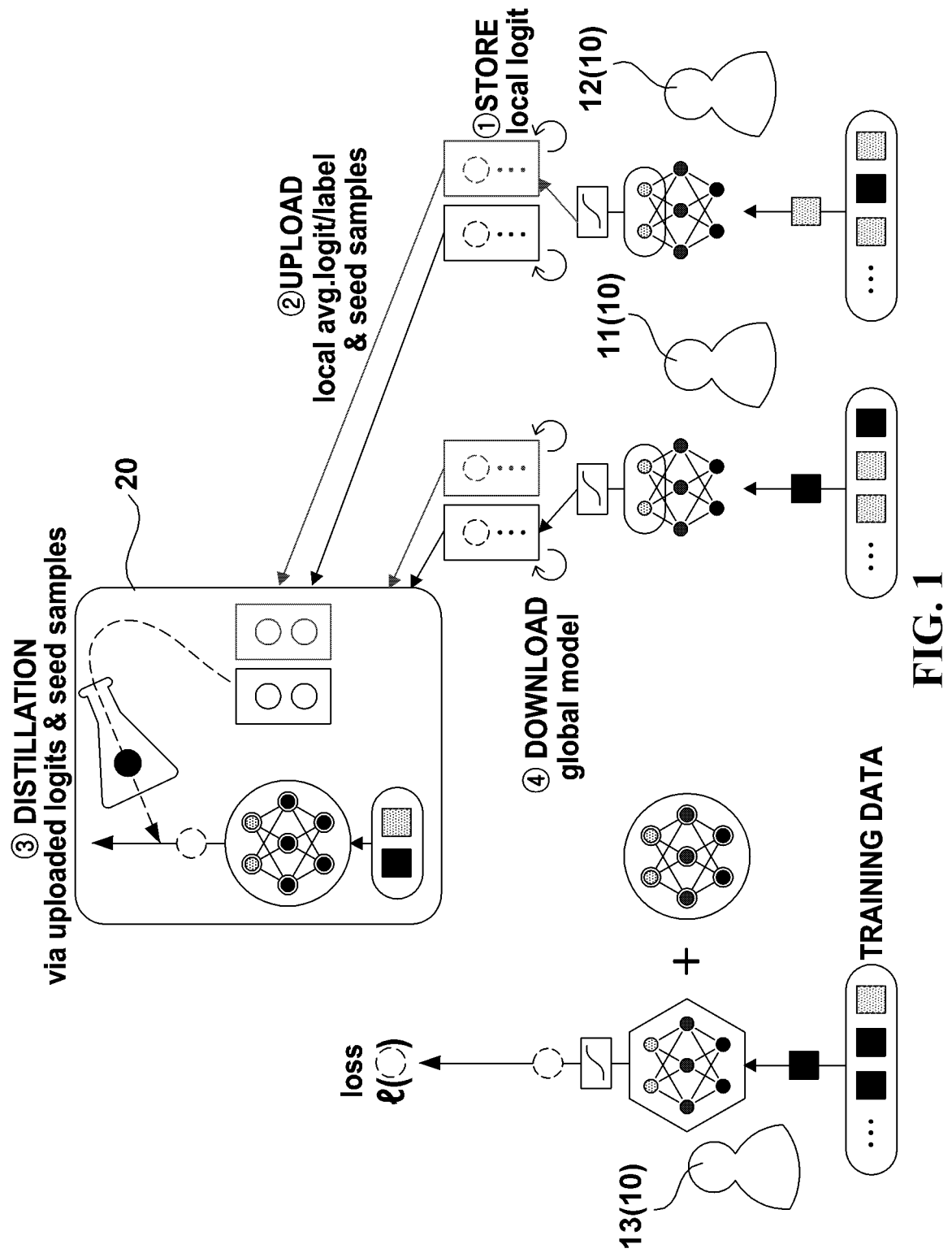
FIGS. 1 and 2 are views illustrating a distributed network of a learning operating method based on federated distillation according to an exemplary embodiment of the present disclosure.

Hereinafter, a learning operating method based on a federated distillation related to the present disclosure, a learning operating server, and a learning operating terminal will be described in more detail with reference to the drawings. However, the present invention can be realized in various different forms, and is not limited to the exemplary embodiments described herein. In order to clearly describe the present invention, a part which may obscure the present invention may be omitted and like reference numerals denote like components.

It should be understood that, when it is described that an element is "coupled" or "connected" to another element, the element may be directly coupled or directly connected to the other element or coupled or connected to the other element through a third element.

Terms such as first or second may be used to describe various components but the components are not limited by the above terms. The above terms are used only to distinguish one component from the other component.

The present disclosure relates to a learning operating method based on federated distillation, a learning operating server, and a learning operating terminal.

Figure 2:
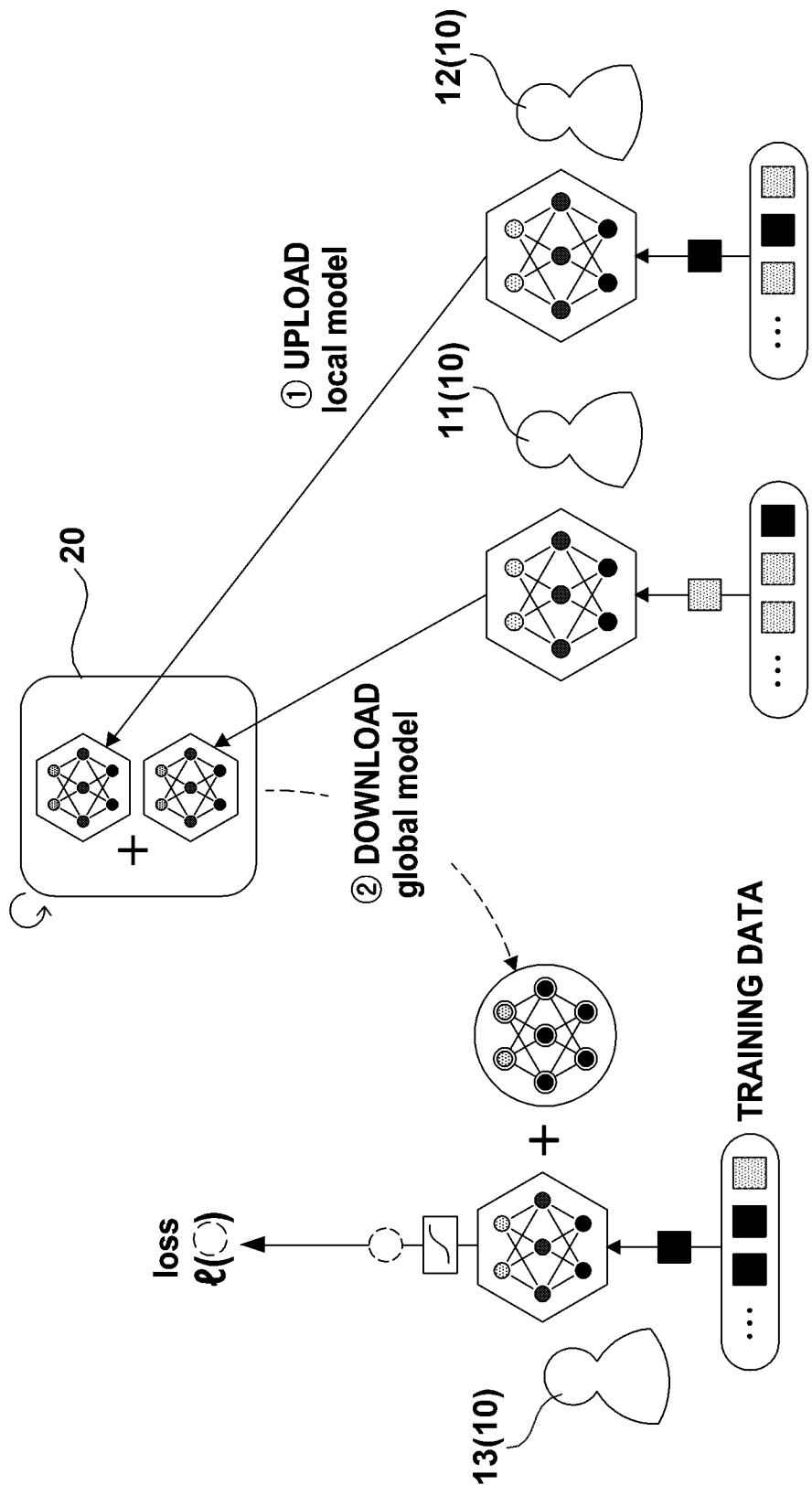
Figure 6A:
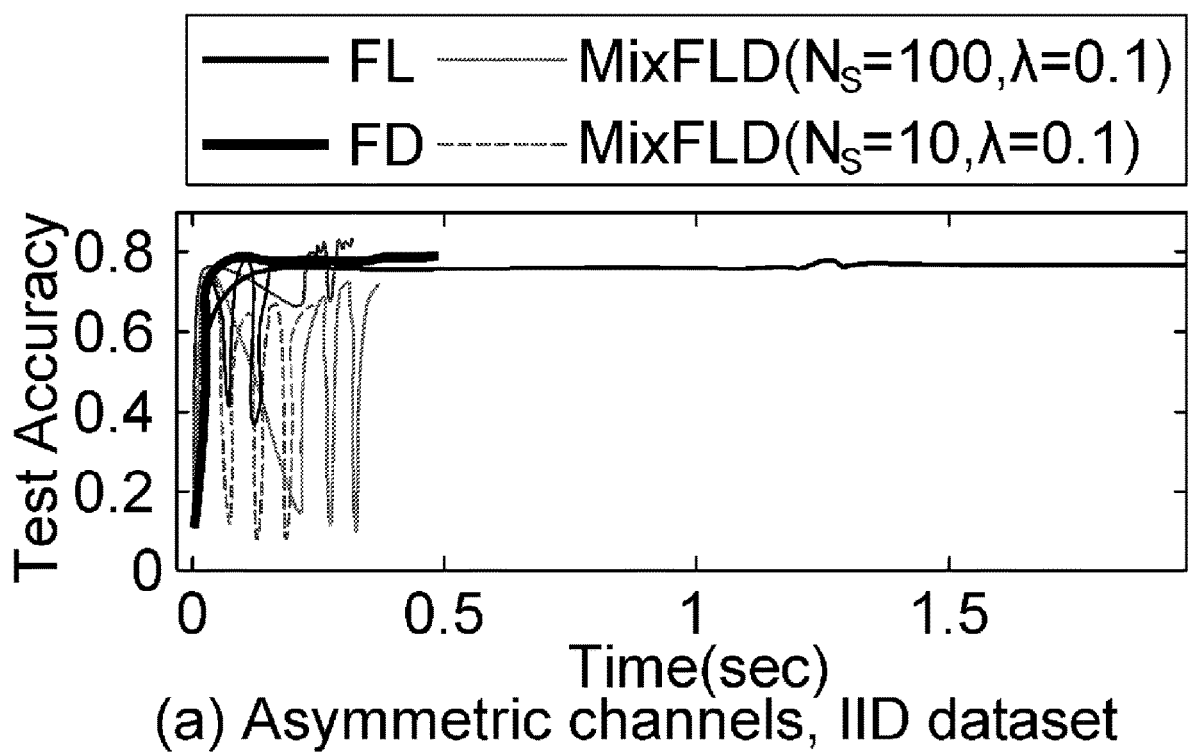
FIGS. 6A to 6D are views illustrating a learning curve according to an exemplary embodiment of the present disclosure.
Figure 6B:
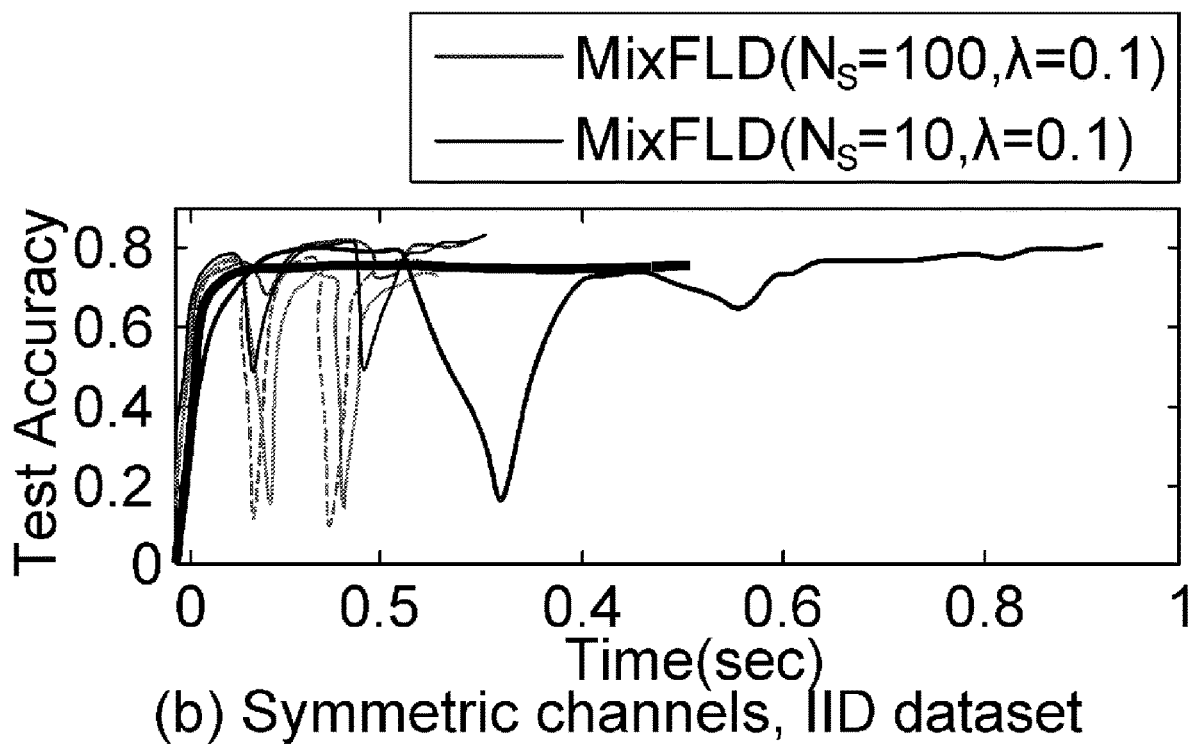
Figure 6C:
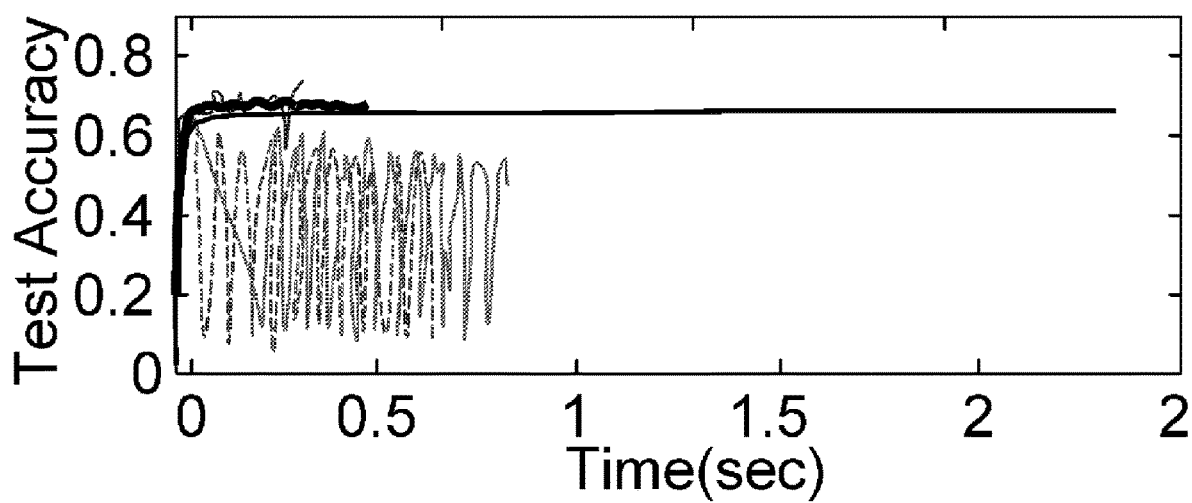
Figure 6D:
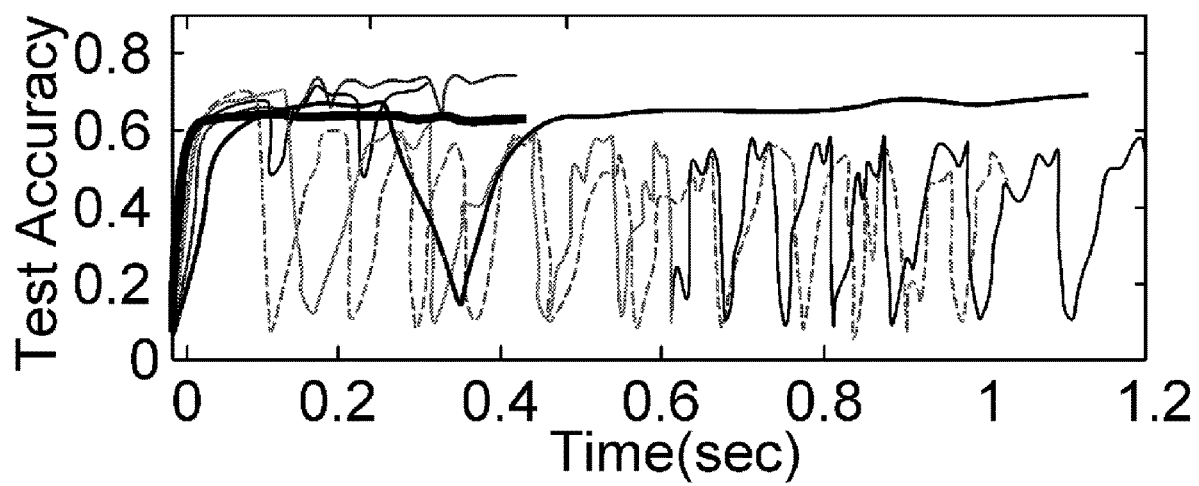

FIGS. 1 and 2 are views illustrating a distributed network of a learning operating method based on federated distillation.

Referring to FIGS. 1 and 2, a distributed network is configured by a plurality of terminals 10 and a server 20. Here, the number of terminals is not limited to the exemplary embodiment of the present disclosure and a plurality of terminals may be provided.

In order to solve the privacy and communication overhead problems generated in the distributed network, information which has a small payload size, does not directly transmit the sample, and improves the overall system test accuracy when the exchange is performed is necessary. According to a federated distillation operation method according to the exemplary embodiment of the present disclosure, a ground-truth label is utilized to group samples by labels and an average logit vector for every label obtained by averaging logits corresponding to the samples is utilized to solve the major problems of the distributed network and increase a test accuracy of each terminal.

The present disclosure proposes a method that in the distributed network, each terminal exchanges information with a small communication cost and operates the learning based on the information. By doing this, the test accuracy of each terminal is ensured and the communication overhead generated during the information exchange between terminals is reduced. Further, the privacy problem generated in the distributed network may be solved.

In the related art, in a distributed network environment in which a number of samples owned by a terminal is limited, when each terminal performs local training, there is a problem in that a model biased for the samples is generated. At this time, the terminals exchange information therebetween to solve the overfitting problem generated in a local learning situation and improve the overall test accuracy.

As a representative method, the terminals may directly exchange their raw data samples. There is an averaging weight based federated learning in which the local training is performed and a weight of the learned model is transmitted to a center server at regular intervals without exchanging raw data samples and the server averages the model weights received from a plurality of terminals to transmit the averaged weight.

In addition, in the case of online distillation (co-distillation), at regular intervals, terminals upload raw data samples and a logit vector obtained by substituting the raw data samples into a local learning model to the server and the server averages the sample-logit pair and stores the average. Thereafter, when the terminals perform local training, the terminals request the sample to the server and the server transmits a logit corresponding to the sample to the terminals.

In the related art, according to a method of directly exchanging raw data samples between terminals in the distributed network, when sizes and a number of raw data samples are considered, a payload size and a communication overhead are very large. Further, the privacy is not protected.

In the case of the federated learning, the model weight is exchanged so that the privacy is secured as compared with the method of exchanging the raw data samples. The payload size is also relatively reduced but it is limited to transmit the raw data sample in a channel with a significant fluctuation.

In the case of the online distillation, the payload size is small in a downlink DL and the privacy is secured. However, in the uplink UL, the payload size is very large and the privacy is not protected. Further, since according to this structure, a gain can be achieved only when the server has raw data samples requested by the terminals, a restriction that the performance increase is determined according to a correlation between the samples of the terminals is additionally caused.

According to the exemplary embodiments of the present disclosure, a ground-truth label is utilized to group samples by labels and an average logit vector for every label obtained by averaging logits corresponding to the samples is utilized to solve the privacy and communication overhead problems generated in the distributed network.

A first terminal 11 and a second terminal 12 collect data samples to store the data samples as local logits.

Thereafter, a local average logit is calculated and is transmitted to the uplink of the server.

Specifically, the terminal classifies the samples for every local logit obtained by performing the local training, among the data samples to store the samples as a local label and the terminal calculates the local average logit for every local label, and then transmits the calculated local average logit for every local label to the server.

The first terminal and the second terminal store the logits obtained by performing the local training by labels.

The logit is implemented using Equation 1. For example, in Equation 1, a ground-truth label of a randomly selected sample x is n.

$$L(n, \text{count}(n)) = \text{logit}(x), \text{count}(n) = \text{count}(n) + 1 \quad [\text{Equation 1}]$$

Here, logit(x) is an output value when x is input to the model and count(n) is a value which stores a number of samples in which the ground-truth label is n. This process is repeated for all the selected samples.

A format of the logit vector according to the exemplary embodiment of the present disclosure will be described with reference to FIG. 2.

The first terminal and the second terminal 10a and 10b store the logit obtained by performing the local training by labels.

The terminal calculates an average logit vector for every local label at every $T_p$ iteration.

The average logit vector for every local label may be calculated using Equation 2. For example, in Equation 2, a terminal d and a ground-truth label n are represented.

$$\text{sum}(n) = \Sigma_{k=1}^{\text{count}(n)} L(n, k)$$

$$\text{local}(d, n) = \text{sum}(n)/\text{count}(n) \quad [\text{Equation 2}]$$

Here, sum(n) is a vector sum of logit vectors corresponding to samples in which a ground-truth label is n and local(d, n) is an average logit vector for every local label, for the ground-truth label n in the terminal d.

This processor is performed on all the ground-truth labels.

The first terminal and the second terminal transmit the calculated average logit vector for every local label to the server.

The server 20 calculates an average logit vector for every global label based on the average logit vector for every local label received from the terminals.

The average logit vector for every global label may be calculated using Equation 3. For example, Equation 3 is represented for a ground-truth label n.

$$\text{global}(n) = \sum_{d=1}^{D} \text{sum}(n, d)/D \quad [\text{Equation 3}]$$

Here, global(n) is an average logit vector for every global label for the ground-truth label n and D is a number of all the terminals participating in the distributed network.

This process is performed on all the ground-truth labels.

A third terminal 30→13 performs local training by reflecting the average logit vector for every global label received from the server to a loss function and repeats the process illustrated in FIG. 1 until the training accuracy of the terminal is equal to or higher than a target.

Further, the first terminal 11 and the second terminal 12 transmit seed samples to the uplink of the server.

The first terminal 11 and the second terminal 12 are connected to the server by means of a wireless link and collet data samples to calculate local average logits, transmits the local average logits to the uplink of the server, and transmit seed samples to the uplink of the server.

Here, in order to transmit the seed samples to the uplink, the terminal randomly selects seed samples having different labels and linearly combines the seed samples at a predetermined mixture ratio.

Further, before the step of performing distillation of the global model, the server may assign a random noise to the seed samples to protect the information.

The server 20 performs the distillation of the global model based on the seed samples and the local average logits.

Specifically, the server is connected to the plurality of terminals by means of the wireless link, receives a local average logit calculated by the terminals by collecting the data samples from the terminals through the uplink, and receives the seed samples from the terminal through the uplink to convert the local average logit into a global model parameter, train the global model with the global model parameter and the seed samples, and transmit the trained global model to the downlink of the server.

The distillation of the global model is performed to convert the local average logit into the global model parameter and train the global model with the global model parameter and the seed samples.

Thereafter, the server transmits the trained global model to the downlink of the server and the third terminal 13 receives the trained global model from the server to reflect the global model to the loss function to perform the local training with the training data.

The third terminal 13 is connected to the server by means of the wireless link, the server converts the local average logit into the global model parameter and trains the global model with the global model parameter and the seed samples, and receives the trained global model through the downlink to reflect the global model to the loss function to perform the local training.

That is, the server trains the global model using the local average logits for every local label received from the first terminal and the second terminal and the third terminal receives the trained global model from the server to reflect the global model to the loss function to perform second local training.

As compared with the federated learning of the related art, the payload sizes of the uplink and the downlink may be reduced, but in terms of the final test accuracy of the learning, the loss may be generated.

In a general cellular system configured by a server and devices, uplink transmission powers of the terminals (devices) are uniform. An uplink with an insufficient channel capacity utilizes the average logit vector transmission for every label and a downlink with a sufficient capacity utilizes the model weight transmission as in the federated learning to satisfy the downlink-uplink channel capacity constraints and expect the improved performance of the final test accuracy. In order to satisfy this structure, during the uplink transmission of the terminals, some seed samples are additionally sent to train the global model based on the seed samples and the average logit vector by a center server to transmit the model weight to the downlink.

FIG. 3 is a view illustrating a format of a logit vector according to an exemplary embodiment of the present disclosure.

A size of the logit vector may be equal to a number of total labels to be classified by the terminal by the supervised learning.

When logit vectors 110 for an input sample are determined, the meaning of a value of each element in the vector is the same as a probability that the model of the terminal classifies the sample to the label 100.

For example, a number of total data samples of the terminal d is N and a set 120 of the labels to be classified is given by $\{1, 2, 3\}$, the logit vector is implemented as illustrated in FIG. 3.

FIG. 4 is a view illustrating an FD algorithm according to an exemplary embodiment of the present disclosure.

As illustrated in FIG. 4, a federated distillation algorithm requires a prediction function $F(w, \text{input})$, a loss function $\varphi(F, \text{label})$, and ground-truth label $y_{input}$.

The set S indicates an entire data set of all devices and B is a group in each device.

The function $F(w, a)$ is a logit vector regularized by a softmax function and w and a are a weight and an input of the model.

The function $\varphi(p, q)$ is a cross entropy between p and q and is used for the loss function and the distillation regularizer.

Here, $\eta$ is a learning rate constant and $\gamma$ is a weight parameter of the distillation regularizer.

In an i-th device, $F_{k,l}^{(i)}$ is an average logit vector in which the training sample corresponds to a l-th ground-truth label and k iterations are performed.

$\hat{F}_{k,l}^{(i)}$ is an average logit vector for every global label and is implemented by Equation 4.

$$\hat{F}_{k,l}^{(i)} = \sum_{j \neq i} \overline{F}_{k,l}^{(i)} / (M - 1) \quad \text{[Equation 4]}$$

Here, M is a number of all terminals participating in the distributed network.

Further, $\text{cnt}_{k,l}^{(i)}$ a number of samples in which a ground-truth level is 1.

FIG. 5 is a view illustrating an FLD algorithm according to an exemplary embodiment of the present disclosure.

As illustrated in FIG. 5, a federated learning after distillation (FLD) algorithm includes output upload, mix-up, output-model conversion, reverse-mix-up, and model download processes.

A core idea of the output-model conversion is to convert a knowledge of $G_{out,n}^P$ into a global model having a weight vector $G^P_{mod}$.

In order to activate this, at first (for example, p=1), the terminals upload $N_s$ seed samples arbitrarily selected from the local data set.

The global weight vector $w_s^{(k)}$ is represented by Equation 5.

$$w_s^{(k+1)} = w_s^{(k)} - \eta \nabla(\varphi(F_{s,n}^{[ik]}, L_{s,n}^{[ik]} | w_s^{(k)}) + \beta \Psi(F_{s,n}^{[ik]}, G_{out,n}^P)) \quad \text{[Equation 5]}$$

Here, $F^{[ik]}_{s,n}$ is an output vector of the global model of an n-th label.

The server calculates $G^P_{mod} = w^{(ks)}_s$ downloaded from all the devices.

FIG. 6 is a view illustrating a learning curve according to an exemplary embodiment of the present disclosure.

FIG. 6 illustrates a learning curve and a non IID data set of a device arbitrarily selected from Mix2FLD, as compared with FL, FD, and MixFLD, in asymmetric and symmetric (Pup=Pdn=40 dBm, Wup=Wdn=10 MHz) channels with IID.

FIG. 6 shows that Mix2FLD has the best accuracy and is most quickly converged in the asymmetric and symmetric channel conditions. As compared with the FL upload model weight, a model output upload of Mix2FLD reduces the uplink payload size by up to 622.4 times. In the asymmetric channel (FIGS. 6A and 6C) with a limited uplink capacity, the upload is more frequently successful so that up to 12% higher accuracy and 4.6 times quicker convergence are achieved.

As compared with the FD, the Mix2FLD utilizes a higher downlink capacity to download the global model weight, which may provide higher accuracy than downloading the model output. Further, the global information of Mix2FLD is configured not by simply averaging local outputs used for the FD, but by collecting seed samples and reflecting global data distribution. Therefore, the Mix2FLD achieves up to 15% higher accuracy and 36% quicker convergence than FD.

In the symmetric channel with IID dataset (FIG. 6B), the Mix2FLD and FL achieve the highest accuracy. However, Mix2FLD 3.1 times more quickly converges than FL due to smaller uplink payload size and more frequent update.

In all cases of delay time, the privacy, and accuracy tradeoff, when an amount of seed samples ($N_s$=10) is reduced in Mix2FLD and MixFLD, the accuracy is lowered to provide fast convergence time so that the tradeoff of the delay time and accuracy is caused.

Figure 7:
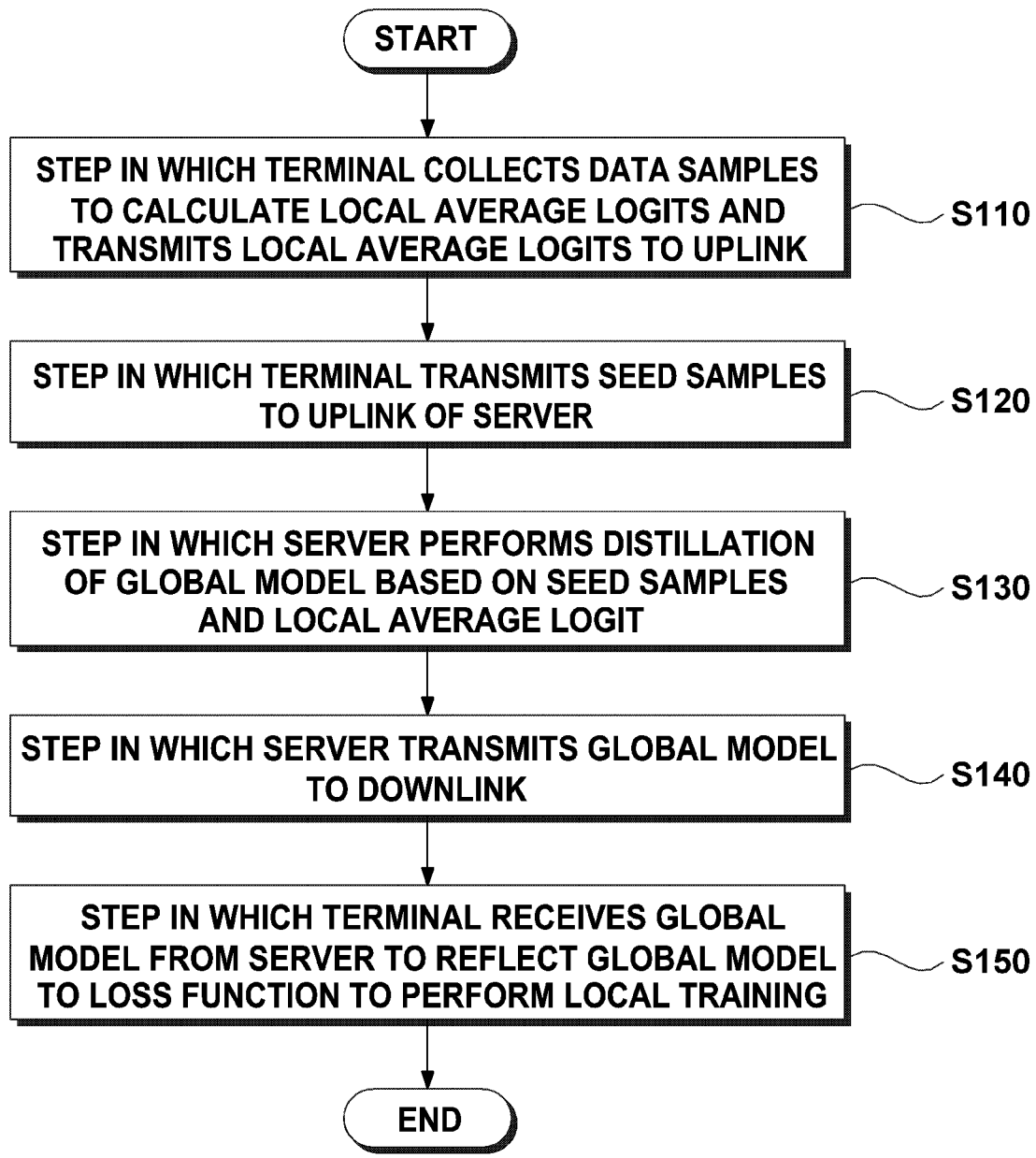
FIGS. 7 and 8 are flowcharts illustrating a learning operating method based on federated distillation.
Figure 8:
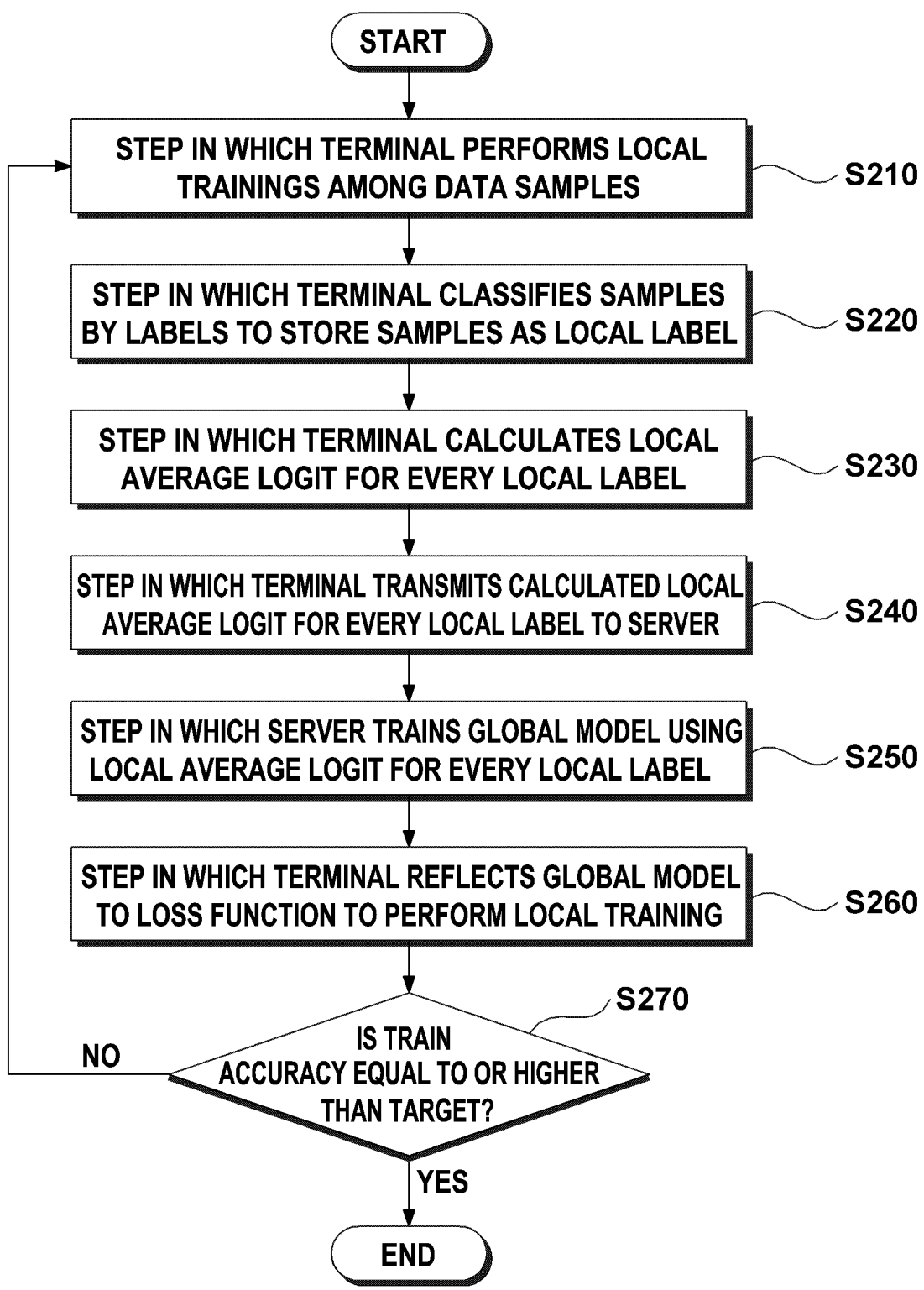

FIGS. 7 and 8 are flowcharts illustrating a learning operating method based on federated distillation.

Referring to FIG. 7, according to a learning operating method based on federated distillation according to the exemplary embodiment of the present disclosure, in step S110, a terminal collects data samples to calculate a local average logit and transmit the local average logit to the uplink of the server.

In step S120, the terminal transmits seed samples to the uplink of the server.

In step S130, the server performs the distillation of the global model based on the seed samples and the local average logit.

In step S140, trained global model is transmitted to a downlink of the server.

In step S150, the terminal receives the trained global model from the server to reflect the trained global model to a loss function to perform local training.

To be more specific, referring to FIG. 8, according to a learning operating method based on federated distillation according to the exemplary embodiment of the present disclosure, in step S210, the terminal performs the local training among the data samples.

In step S220, the terminal classifies the samples for every local logit to store the samples as a local label.

In step S230, the terminal calculates a local average logit by local labels.

In step S240, the terminal transmits the calculated local average logit for every local label to the server.

In step S250, the server trains the global model using the local average logits for every local label received from the first terminal and the second terminal.

In step S260, the third terminal receives the trained global model from the server to reflect the trained global model to a loss function to perform second local training.

In step S270, it is checked whether a predetermined training accuracy is equal to or higher than a target and when the accuracy is lower than the target, steps S210 to S260 are repeated.

The learning operating method based on the federated distillation needs to consider a heterogeneous network environment depending on a situation.

Figure 9:
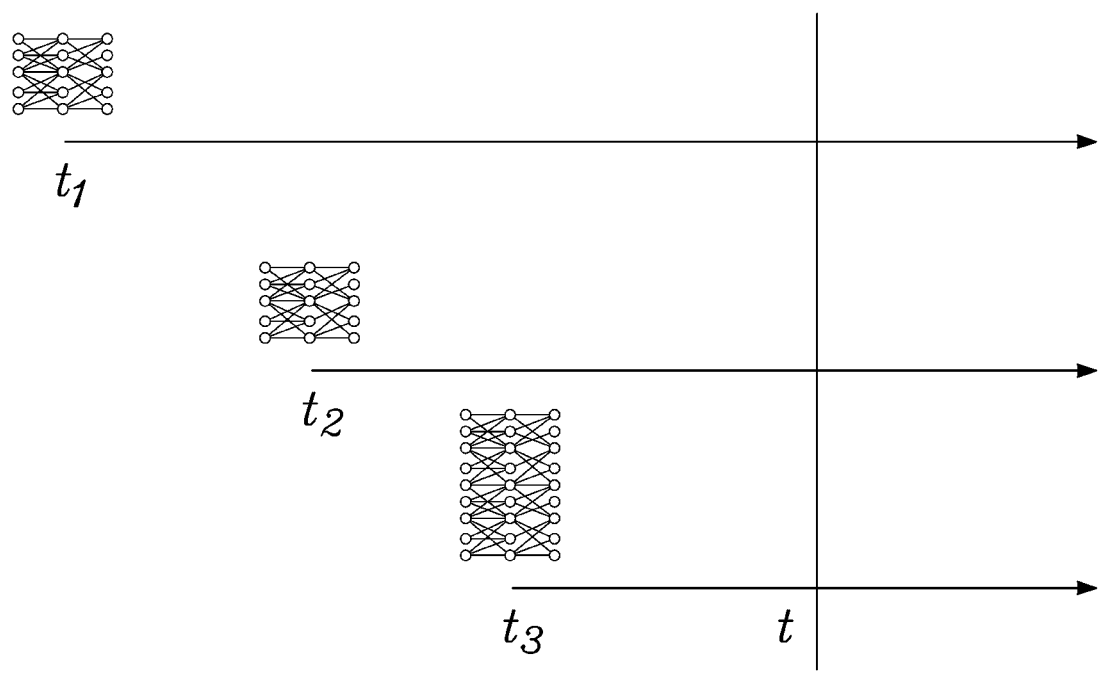
FIG. 9 is a view illustrating a heterogeneous network environment.

FIG. 9 is a view illustrating a heterogeneous network environment.

The heterogeneous network refers to a network which considers a scenario that the model size and a time to participate in the federated distillation (FD) process vary depending on the terminal. When a plurality of terminals participate in the FD process on the heterogeneous network, the server may operate to generate global average logits/label by local average logits/label received from the plurality of terminals.

During the federated distillation process under the assumption of the heterogeneous network, when the prediction is transmitted in the process of generating local average logits/label, a prediction value (or logit) is converted using a conception of a temperature T.

The prediction value (or the logit) is converted by reflecting the model size and a model update starting timing in a process of generating global average logits/label based on the local average logits/label transmitted during the federated distillation process under the assumption of the heterogeneous network.

The prediction in the beginning of the learning is inaccurate. Further, the accuracy of the prediction generated in a terminal with a large model size is relatively high. To this end, a temperature control based local average logit/label to which a time from a timing when the federated distillation process starts or a learning cycle is reflected is generated. The global average logits/label is generated by the averaging to which a weight to which the model size of each terminal belonging to the heterogeneous network and the local model learning start timing are reflected is applied.

Referring to FIG. 9, it is assumed that t is a time when a federated distillation process starts, t1, t2, and t3 are times when the update of the local model of the terminal participating in the learning starts. At this time, when the time is t' (t'>t) or a learning cycle is repeated m times, the local average logits/label are converted based on the temperature.

$$\text{local\_hetero}(d, n) = \frac{\exp\left(\frac{\text{local } (d, m)}{T}\right)}{\sum_{m \neq n} \exp\left(\frac{\text{local } (d, m)}{T}\right)} \quad \text{[Equation 6]}$$

$$T = c_1/(t' - t) \text{ or } T = c_2/m \quad \text{[Equation 7]}$$

A number of terminals is n and $c_1$ and $c_2$ are constants. As a method for determining T, rather than an inverse form of Equation 7, all descending functions with respect to t'-t or m are included.

Thereafter, the server aggregates the local average logits/label. When the global average logits/label is generated by the acquired local average logits/label, an averaging technique in which the weight is applied to the federated distillation process is utilized.

When the weight-applied averaging technique is applied, as represented in Equation 8, a weight of the local average logit/label of each terminal is determined to generate a global average logit/label.

$$\text{global\_hetero}(n) = \frac{\sum_d \text{w\_d} \cdot \text{local\_hetero}(d, n)}{\sum_d \text{w\_d}} \quad \text{[Equation 8]}$$

$$W_d = c_3 \cdot M_d^\alpha \cdot (t - t_d)^\beta \quad \text{[Equation 9]}$$

At this time, $c_3$ is a constant, $M_d$ is a model size of a d-th terminal, $t_d$ is a model update start timing, and alpha and beta are parameters to determine a degree of reflecting the model size and the model update start timing to determine a weight, respectively. When the acquired global average logits/label is broadcasted to the terminals, one cycle of federated distillation is finished.

Figure 10:
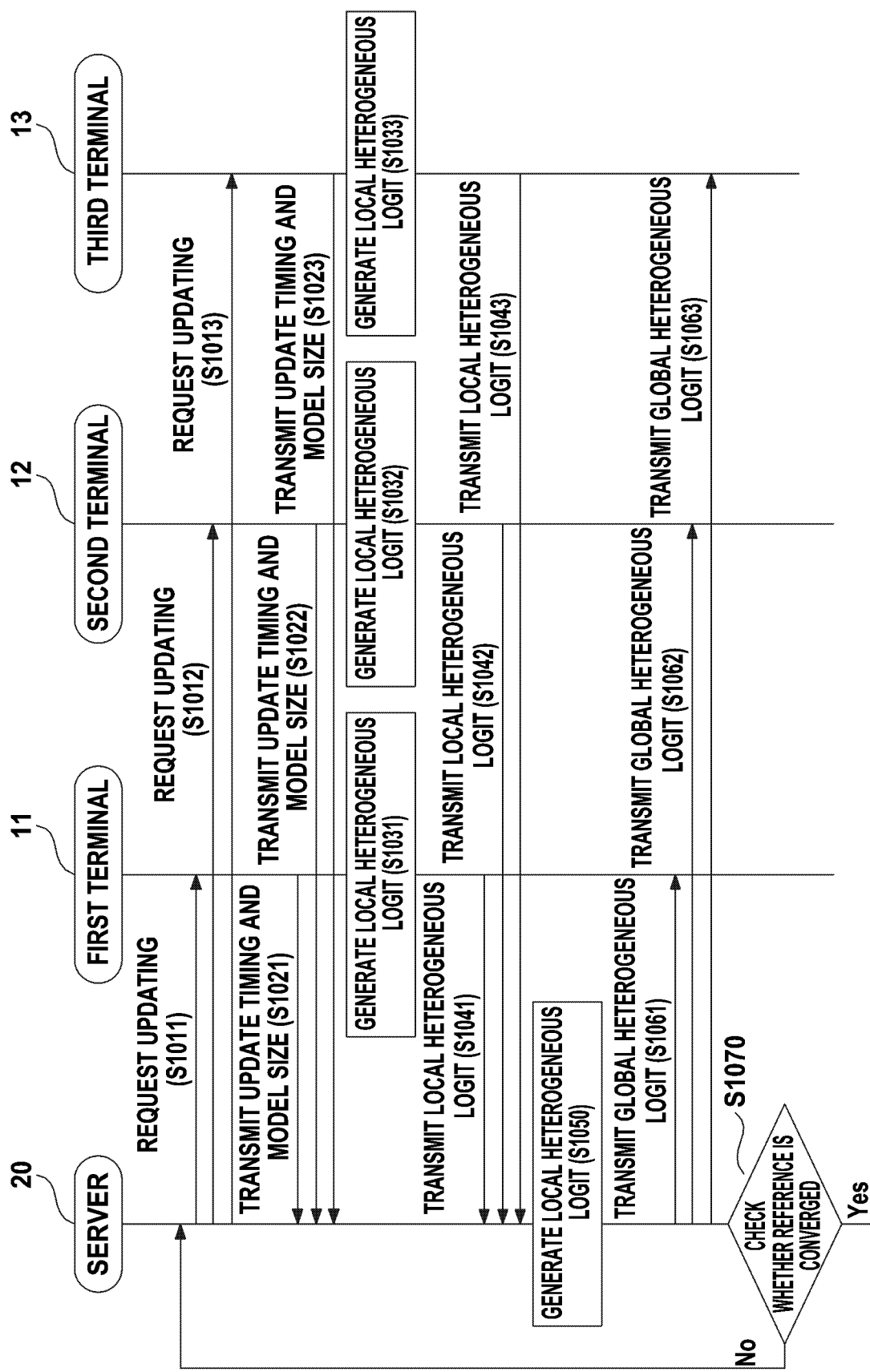
FIG. 10 is a flowchart illustrating that a learning operating method based on the federated distillation according to an exemplary embodiment of the present disclosure operates in a heterogeneous network environment.

FIG. 10 is a flowchart illustrating that a learning operating method based on the federated distillation according to an exemplary embodiment of the present disclosure operates in a heterogeneous network environment.

The entire process of the federated distillation which reflects the local average logits/label and the global average logits/label in the heterogeneous network is as follows.

The server requests the updating to each terminal (S1011, S1012, S1013).

The d-th terminal (d∈D) starts the updating of the model having a size $M_d$ at the time $t_d$. At this time, the time $t_d$ and the model size $M_d$ are transmitted to the server (S1021, S1022, S1023).

The first federated distillation process starts at the time t. All the d-th terminal generates a local logit (d, n). The local logit generating process may apply the learning operating method described in FIG. 8. n indicates an index for a ground-truth label order. Thereafter, a local heterogeneous logit (d,n) is generated (S1031, S1032, S1033).

All the d-th terminals transmit local heterogeneous logits (d, n) for all n to the server (S1041, S1042, S1043).

The server generates a global heterogeneous logit n by the received learning start timing and model size (S1050).

The server broadcast and transmits the global heterogeneous logits (n) for all n to the terminals. Each terminal applies the received global heterogeneous logits to the local logit.

The processes S1011 to S1063 are repeated until the algorithm is converged S1070.

The above description is just an example of the present invention and those skilled in the art may modify the present invention without departing from an essential characteristic of the present invention. Accordingly, the scope of the present invention is not limited to the above-described embodiment, but should be construed to include various embodiments within the scope equivalent to the description of the claims.

What is claimed is:

1. A learning operating method for reducing communication overhead in a distributed network configured by a server and a plurality of terminals, comprising:
   a step in which the terminals collect data samples, calculate local average logits based on the data samples by performing first local trainings, and transmit the local average logits to of the server using wireless uplinks, respectively;
   a step in which the terminals transmit seed samples to the server using the respective wireless uplinks; and
   a step in which the server performs the distillation of a global model based on the seed samples and the local average logits;
   a step in which the terminals transmit an update start timing of a local model and a size of the local model to the server;
   a step in which the terminals convert the local average logits into local heterogeneous logits and then transmit the local heterogeneous logits to the server;
   a step in which the server receives the update start timing of the local model of each terminal and the size of the local model of each terminal;
   a step in which the server receives the local heterogeneous logits and generates global heterogeneous logits using the local heterogeneous logits;
   a step in which the server broadcasts the global heterogeneous logits to the terminals; and
   a step in which the terminals perform respective second local trainings based on the trained global model.

2. The learning operating method in a distributed network according to claim 1, further comprising:
   before the step in which the server performs the distillation of the global model,
   a step in which the server assigns a random noise to the seed samples to protect information.

3. The learning operating method in a distributed network according to claim 1, wherein the step in which the server performs the distillation of the global model based on the seed samples and the local average logit, includes the steps of:
   converting the local average logit into a global model parameter; and
   training the global model with the global model parameter and the seed sample.

4. The learning operating method in a distributed network according to claim 3, further comprising:
   a step of transmitting the trained global model to a downlink of the server.

5. The learning operating method in a distributed network according to claim 1, wherein the step in which the terminals collect data samples, calculate a local average logit based on the data samples, and transmit the local average logits to the server includes:
   a step in which the terminals classify samples for every local logit obtained by performing the first local training, among the data samples to store the samples as a local label;
   a step in which the terminals calculate a local average logit for every local label; and
   a step in which the terminals transmit the calculated local average logit for every local label to the server.

6. The learning operating method in a distributed network according to claim 5, wherein the plurality of terminals includes a first terminal to a third terminal,
   further comprising:
   a step in which the server trains the global model using the local average logit for every local label received from the first terminal and the second terminal;
   a step in which the third terminal receives the trained global model from the server to reflect the trained global model to a loss function to perform the second local training.

7. The learning operating method in a distributed network according to claim 6, wherein the step in which the server trains the global model using the local average logit for every local label received from the first terminal and the second terminal is repeated until a predetermined training accuracy is equal to or higher than a target.

8. The learning operating method in a distributed network according to claim 1, wherein the local heterogeneous logits are converted from the local average logits based on a temperature of the terminals and
   the temperature is expressed by a descending function with respect to an elapsed time from the update start timing or expressed by a descending function with respect to a learning cycle of the local model.

9. The learning operating method in a distributed network according to claim 1, wherein the global heterogeneous logits are calculated by applying a weight calculated based on the size of the local model of each terminal and the update start timing of each terminal to each local heterogeneous logit.

10. A learning driving server of a distributed network, wherein the server is connected to a plurality of terminals by means of a wireless link, receives local average logits which are calculated by the terminals from data samples collected by the terminals through a wireless uplink and receives seed samples from the terminals through the wireless uplink to convert the local average logits into a global model parameter, train a global model with the global model parameter and the seed samples, and transmit the trained global model to a downlink of the server,
   wherein the server receives the update start timing of the local model of each terminal and the size of the local model of each terminal, the server receives the local heterogeneous logits and generates global heterogeneous logits using the local heterogeneous logits, and the server broadcasts the global heterogeneous logits to the terminals, and
   wherein the trained global model is configured for use in performing local training by the terminals.

11. A learning driving terminal of a distributed network, wherein the terminal is connected to a server by means of a wireless link, collects data samples to calculate local average logits and transmit the local average logit to an uplink of the server, transmits seed samples to the server,
   wherein the terminal transmits an update start timing of a local model and a size of the local model to the server and converts the local average logits into local heterogeneous logits and then transmits the local heterogeneous logits to the server.

12. The learning driving terminal of a distributed network according to claim 11, wherein the server converts the local average logit into the global model parameter and trains the global model with the global model parameter and the seed sample, and receives the trained global model through the downlink to reflect the global model to the loss function to perform the local training.

* * * * *